United States Patent
Fagerlund et al.

(10) Patent No.: US 8,931,591 B2
(45) Date of Patent: Jan. 13, 2015

(54) SIMPLIFIED MODAL ATTENUATOR

(71) Applicant: Fisher Controls International LLC, Marshalltown, IA (US)

(72) Inventors: Allen C. Fagerlund, Marshalltown, IA (US); James L. Gossett, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 14/038,208

(22) Filed: Sep. 26, 2013

(65) Prior Publication Data
US 2014/0090922 A1    Apr. 3, 2014

Related U.S. Application Data

(60) Provisional application No. 61/707,591, filed on Sep. 28, 2012.

(51) Int. Cl.
| | | |
|---|---|---|
| *F16L 55/02* | (2006.01) | |
| *F01N 1/02* | (2006.01) | |
| *F16L 55/033* | (2006.01) | |
| F16L 55/00 | (2006.01) | |
| F01N 1/00 | (2006.01) | |
| G10K 11/172 | (2006.01) | |
| F02M 35/12 | (2006.01) | |

(52) U.S. Cl.
CPC ............... *F16L 55/0336* (2013.01); *F01N 1/02* (2013.01); *F16L 55/033* (2013.01); *G10K 11/172* (2013.01); *F02M 35/1266* (2013.01)
USPC .......................................... 181/250; 181/233

(58) Field of Classification Search
USPC ......... 181/207, 252, 256, 250, 249, 255, 258, 181/233; 137/625
See application file for complete search history.

(56) References Cited

U.S. PATENT DOCUMENTS

| | | | | |
|---|---|---|---|---|
| 821,828 | A | * | 5/1906 | Phelps .......................... 181/258 |
| 822,127 | A | * | 5/1906 | Hufnagel ...................... 181/239 |
| 1,342,978 | A | * | 6/1920 | Young ........................... 89/14.3 |
| 1,909,511 | A | * | 5/1933 | Wilson ......................... 181/256 |
| 2,016,253 | A | * | 10/1935 | Noblitt et al. ................. 181/249 |
| 2,073,951 | A | * | 3/1937 | Servais ......................... 181/252 |

(Continued)

FOREIGN PATENT DOCUMENTS

| | | |
|---|---|---|
| EP | 1291570 A2 | 3/2003 |
| GB | 471431 A | 9/1937 |

OTHER PUBLICATIONS

Broukhiyan, "The Modal Coincidence Suppression Device (MCSD) for the Reduction of Noise from Control Valves;" 1983.

(Continued)

*Primary Examiner* — Edgardo San Martin
(74) *Attorney, Agent, or Firm* — Marshall, Gerstein & Borun LLP

(57) ABSTRACT

A modal attenuator may include an attenuator body having a lead-in segment and a lead-out segment joined by a connection segment, a perforated screen disposed within the attenuator body and spaced apart from the attenuator body to form an annular space, and a plurality of rings disposed between the perforated screen and the attenuator body. When fluid flows through the modal attenuator, sound waves pass through the perforated screen and are reflected back by the plurality of rings to disrupt other sound waves, thereby reducing fluid noise in the modal attenuator.

16 Claims, 3 Drawing Sheets

(56) References Cited

U.S. PATENT DOCUMENTS

| | | | | |
|---|---|---|---|---|
| 2,233,804 A | * | 3/1941 | Bourne | 181/233 |
| 2,311,676 A | * | 2/1943 | Maxim | 181/252 |
| 2,326,612 A | * | 8/1943 | Bourne | 181/252 |
| 3,142,354 A | * | 7/1964 | Kammerer et al. | 181/252 |
| 3,175,640 A | * | 3/1965 | Matsui | 181/252 |
| 3,233,697 A | * | 2/1966 | Slayter et al. | 181/245 |
| 3,495,950 A | * | 2/1970 | Frost et al. | 422/171 |
| 3,620,329 A | * | 11/1971 | Wenzlaff | 181/218 |
| 3,791,483 A | * | 2/1974 | Vasiljevic | 181/252 |
| 3,842,932 A | * | 10/1974 | Gibel | 181/258 |
| 3,955,643 A | * | 5/1976 | Clark | 181/248 |
| 4,091,892 A | * | 5/1978 | Hehmann et al. | 181/286 |
| 4,134,472 A | * | 1/1979 | Trainor | 181/258 |
| 4,346,781 A | * | 8/1982 | Ingard et al. | 181/206 |
| 4,979,587 A | * | 12/1990 | Hirt et al. | 181/213 |
| 5,162,620 A | * | 11/1992 | Ross et al. | 181/220 |
| 5,183,974 A | * | 2/1993 | Wilhelm et al. | 181/0.5 |
| 5,909,016 A | * | 6/1999 | Sterling | 181/230 |
| 6,116,375 A | | 9/2000 | Lorch et al. | |
| 7,278,514 B1 | * | 10/2007 | Quigley | 181/256 |
| 7,325,474 B2 | * | 2/2008 | Yoshimura et al. | 89/14.4 |
| 7,367,424 B2 | * | 5/2008 | Brown et al. | 181/250 |
| 7,497,301 B2 | * | 3/2009 | Cheng et al. | 181/248 |
| 7,584,821 B2 | * | 9/2009 | Prior et al. | 181/241 |
| 7,810,609 B2 | * | 10/2010 | Sikes et al. | 181/250 |
| 7,934,581 B2 | * | 5/2011 | Kim et al. | 181/250 |
| 8,511,427 B2 | * | 8/2013 | Dittmar et al. | 181/225 |

OTHER PUBLICATIONS

Search Report for PCT/US2013/062090, mailed Jan. 7, 2014.
Written Opinion for PCT/US2013/062090, mailed Jan. 7, 2014.

* cited by examiner

SIMPLIFIED MODAL ATTENUATOR

BACKGROUND

1. Field of the Disclosure

The invention generally relates to noise reduction devices for control valves and regulators and more specifically to an in-line modal attenuator for a control valve or regulator.

2. Related Technology

Fluid valves control the flow of fluid from one location to another. When the fluid valve is in a closed position, high pressure fluid on one side is prevented from flowing to a lower pressure location on the other side of the valve. The pressure differences between an inlet and an outlet of the control valve, along with a tortuous flow path through the control valve, produce turbulent fluid flow downstream of the control valve, which causes unwanted and potentially harmful noise.

In an attempt to reduce noise, multi-port cages or trims have been used in some regulators to reduce the pressure drop across the cage and to smooth downstream flow. However, these cage-type noise reducers also reduce fluid flow rates through the cage, which may reduce efficiency of the regulator.

Other types of sound reducing devices include materials disposed in the flow path that absorb sound waves and convert the sound waves to heat energy. However, such sound absorbing materials have limited effective frequencies and they also reduce fluid flow through the material.

Recently some attempts have been made to reduce noise with attenuation devices located downstream of the regulator. In particular, a modal coincidence suppression device is described in "The Modal Coincidence Suppression Device (MCSD) For The Reduction Of Noise From Control Valves" by Ali E. Broukhiyan, hereinafter ("MCSD") which is hereby incorporated by reference herein. However, the modal suppression device disclosed in MCSD was very heavy and was difficult to assemble.

SUMMARY OF THE DISCLOSURE

In accordance with one exemplary aspect of the present invention, a modal attenuator may include an attenuator body having a lead-in segment and a lead-out segment joined by a connection segment, a perforated screen disposed within the attenuator body that is spaced apart from the attenuator body to form an annular space, and a plurality of rings disposed between the perforated screen and the attenuator body. When fluid flows through the modal attenuator, sound waves pass through the perforated screen and are reflected back by the plurality of rings to disrupt other sound waves, thereby reducing fluid noise in the modal attenuator.

In accordance with another exemplary aspect of the present invention, a method of reducing noise from fluid flowing through a pipe may include arranging a plurality of annular rings within an attenuator body, arranging a perforated screen within the attenuator body so that a distance between the perforated screen and an inner surface of the rings in the plurality of rings defines an annular space, and arranging opposing rings in the plurality of rings at a distance that corresponds to disruption of a particular frequency of sound wave.

In further accordance with any one or more of the foregoing aspects, a modal attenuator (or a method of reducing noise from fluid flowing through a pipe) may further include any one or more of the following preferred forms.

In some preferred forms, the modal attenuator may further include a plurality of walls disposed on an inner surface of the attenuator body that extend substantially perpendicular to a direction of fluid flow through the attenuator body, the walls defining a plurality of cavities between the screen body and the attenuator body. In other preferred forms, the modal attenuator may include least two cavities in the plurality of cavities that differ in volume. In yet other embodiments, the modal attenuator may include cavities that increase in volume from an inlet towards a connecting segment. In yet other preferred embodiment, the modal attenuator may include cavities that decrease in volume from the connecting segment towards an outlet. In yet other preferred embodiments, the modal attenuator may include a plurality of cavities that approximate a curve when viewed in cross-section.

In other preferred forms, the modal attenuator may include a cone-shaped lead-in segment. In still other preferred forms, the modal attenuator may include a cone-shaped lead-out segment. In yet other preferred forms, the modal attenuator may include a first flange at a first end and a second flange at a second end.

In other preferred forms, the perforated screen may include a plurality of perforations. In yet other preferred forms, at least one perforation in the plurality of perforations may be circular in shape.

In other preferred forms, the modal attenuator may include a spring that is disposed between one ring in the plurality of rings and an inlet portion of the attenuator body.

In other preferred forms, the perforated screen may have an inner diameter that is substantially the same as an inner diameter of the attenuator body.

In other preferred forms, the modal attenuator may include a perforated plate disposed within the attenuator body, the perforated plate extending substantially perpendicular to a direction of fluid flow through the attenuator body. In yet other preferred forms, the modal attenuator may include a distance between opposite rings that corresponds to disruption of a particular frequency of sound wave.

DETAILED DESCRIPTION

The modal attenuators described herein advantageously provide noise reduction downstream of regulators or control valves while having very little flow restriction. Thus, the disclosed modal attenuators are highly efficient in reducing noise. The disclosed modal attenuators may be significantly smaller and/or lighter than current noise reduction devices. Thus, the disclosed modal attenuators may be used in regulators or control valves having smaller valve bodies.

Additionally, a perforated tube in the disclosed modal attenuators may be customized for particular uses by adjusting the transmission index of the perforated tube. Moreover, the disclosed modal attenuators may be combined with more traditional noise suppression devices, such as noise reducing trims, to achieve a more comprehensive noise reduction.

Generally speaking, the modal attenuators described herein reduce noise in a fluid flowing through a pipe or tube by using sound wave interference to destroy or reduce the amplitude of sound waves in a pipe. The disclosed modal attenuators use a series of different sized or shaped gaps, which are created by internal plates in distinct patterns. The overall length and/or spacing of the gaps may be optimized for a particular gas or flow configuration to target specific sound wave frequencies.

Unless specified otherwise, any of the features or characteristics of any one of the embodiments of the modal attenuator disclosed herein may be combined with the features or characteristics of any of the other embodiments of modal attenuators.

Figure 1:
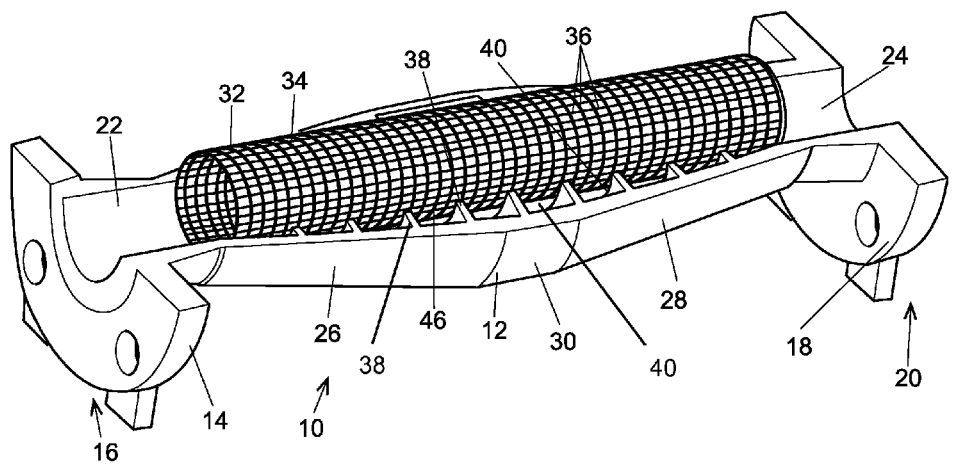
FIG. 1 is a cutaway perspective view of a modal attenuator.

Turning now to FIG. 1, one exemplary embodiment of a modal attenuator 10 includes a hollow attenuator body 12, a first attachment flange 14 at a first end 16 of the hollow attenuator body 12 and a second attachment flange 18 at a second end 20 of the hollow attenuator body 12. The first attachment flange 14 and the second attachment flange 18 are attachable in-line with process pipes and or in-line with a regulator at one end and a process pipe at the other end. Thus, the disclosed modal attenuators 10 are easily retrofitted on virtually any process system because there is no need to replace or modify the regulators and the modal attenuator 10 attaches like any other pipe segment.

The hollow attenuator body 12 may include an inlet portion 22 connected to the first attachment flange 14 and an outlet portion 24 connected to the second attachment flange 18. The inlet portion 22 and the outlet portion 24 may be substantially cylindrical in shape with a substantially constant inner diameter. A cone-shaped lead-in segment 26 may be attached to the inlet portion 22 and a cone-shaped lead-out segment 28 may be attached to the outlet portion 24. The lead-in segment 26 may have a smaller diameter proximate the inlet 22 and the lead-out segment 28 may have a smaller diameter proximate the outlet 24. Stated another way, the lead-in segment may diverge and the lead-out segment 28 may converge. The lead-in segment 26 may be joined to the lead-out segment 28 by a substantially cylindrical connection segment 30.

A perforated hollow screen 32 may be located within the attenuator body 12, and the screen 32 may have an inner diameter that is substantially the same as the inner diameter of the inlet 22 and/or the outlet 24. The screen 32 may have a cylindrical screen body 34 including a plurality of perforations 36. In one exemplary embodiment, at least one of the perforations 36 may be circular in shape. In other embodiments, the perforations 36 may take on other shapes, such as, for example, square, rectangular, triangular, polygonal, oval, or irregular. In other embodiments, the screen body 34 may be fully or partially coated with a sound absorbing material.

A plurality of walls 38 may be disposed on an inner surface of the attenuator body 12. The walls 38 divide a space between the inner surface of the attenuator body 12 and an outer surface of the screen body 34 into a plurality of chambers 40. At least two of the chambers 40 defining different volumes. In the embodiment of FIG. 1, a volume of the chambers increases in the lead in segment 26 of the attenuator body 12 from the inlet 22 towards the connection segment 30. On the other hand, a volume of the chambers 40 decreases in the lead-out segment 28 from the connection portion 30 towards the outlet 24. The walls 38 and chambers 40 are arranged to reflect sound waves in the fluid moving through the modal attenuator 10 back towards an interior of the screen body 34, which results in disruption or cancellation of the sound waves as they collide with other sound waves in the interior of the screen body 34. The openings 36 allow the sound waves to propagate back and forth between the interior of the screen body 34 and the chambers 40. By controlling the volume and width of the chambers 40, along with a distance between opposing chambers, certain frequencies of sound waves may be targeted for disruption. Each chamber 40 defines an annular space 46 between the screen body 34 and the attenuator body 12. Each annular space 46 has a width 47 and a height 49. Widths and heights may vary from chamber 40 to chamber 40.

Figure 2:
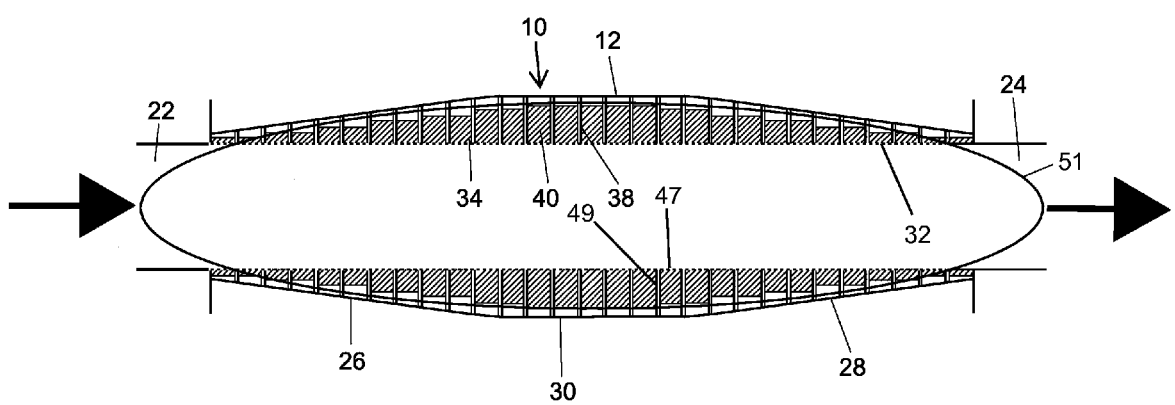
FIG. 2 is a side schematic cross-sectional view of the modal attenuator of FIG. 1.

Turning now to FIG. 2, the attenuator body 12 is illustrated schematically in a longitudinal cross-section. In FIG. 2, hatched sections 41 illustrate hollow cavities or chambers 40. The chambers 40 progress from smaller volumes near the inlet 22 and the outlet 24 to larger volumes near the connection segment 30. The volume increases and decreases may approximate a curve 51. The curve 51 may be defined by a mathematical formula for an ellipse.

The curve 51 may be adjusted to target specific sound wave frequencies, and thus be customized for any particular application.

Figure 3:
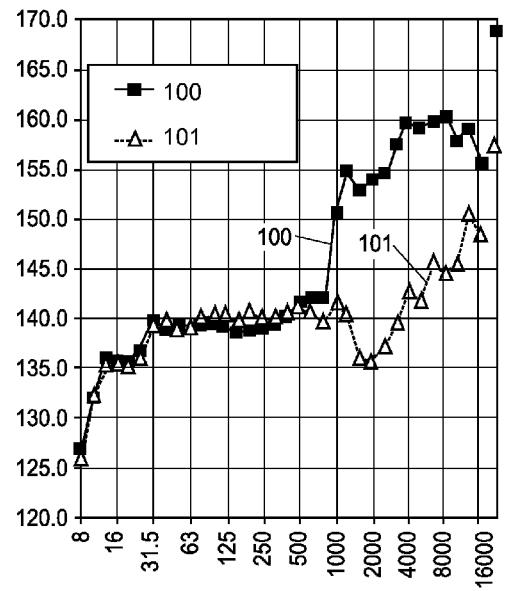
FIG. 3 is a data graph comparing noise reduction between a straight pipe and one embodiment of a modal attenuator.

FIG. 3 is a graphical comparison between sound levels 100 in a typical straight pipe, and sound levels 101 in a modal attenuator. The vertical axis is internal sound levels in dB and the horizontal axis is one-third octave bland center frequency in Hz. As illustrated, at frequencies above about 1000 Hz, sound levels are significantly reduced in the modal attenuator.

Figure 4:
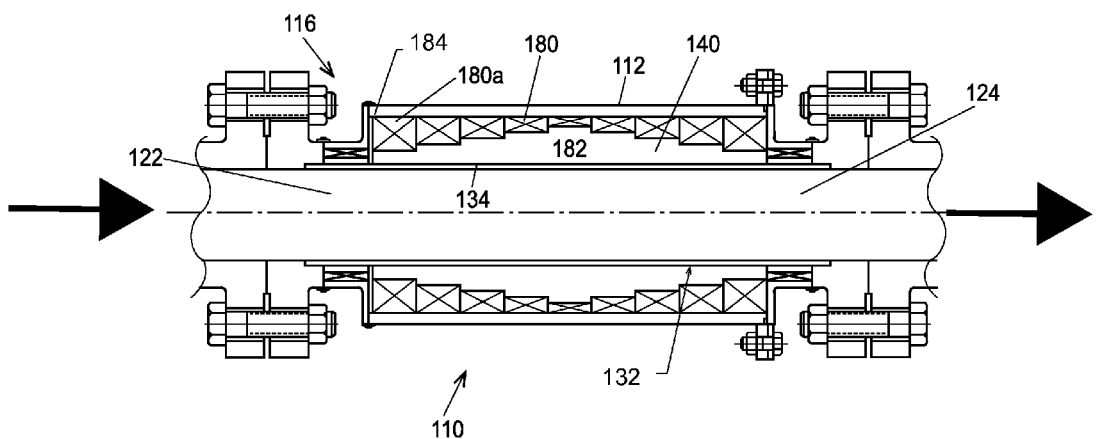
FIG. 4 is a side cross-sectional view of an alternate embodiment of a modal attenuator.

FIG. 4 is a longitudinal cross-sectional view of another embodiment of a modal attenuator 110. In FIG. 4, x-ed sections illustrate solid rings 180. In the embodiment of FIG. 4, the attenuator body 112 is substantially cylindrical in shape and the screen body 134 is disposed within the attenuator body 112. A plurality of rings 180 is disposed between the attenuator body 112 and the screen body 134. At least two of the rings 180 in the plurality of rings 180 have different annular thicknesses. The rings 180 are spaced apart from the screen body 134 to create an annular space 182 between the rings 180 and the screen body 134. As in the embodiments disclosed above, the annular space 182 may approximate a curve, increasing in size from one end of the screen body 134 (proximate the inlet portion 122) towards a middle of the attenuator body 112 and then decreasing in size from the middle of the attenuator body 112 towards the outlet 124. Additionally, a spring 184 may be disposed between a first ring 180a and the first end 116 of the attenuator body 112.

Figure 5:
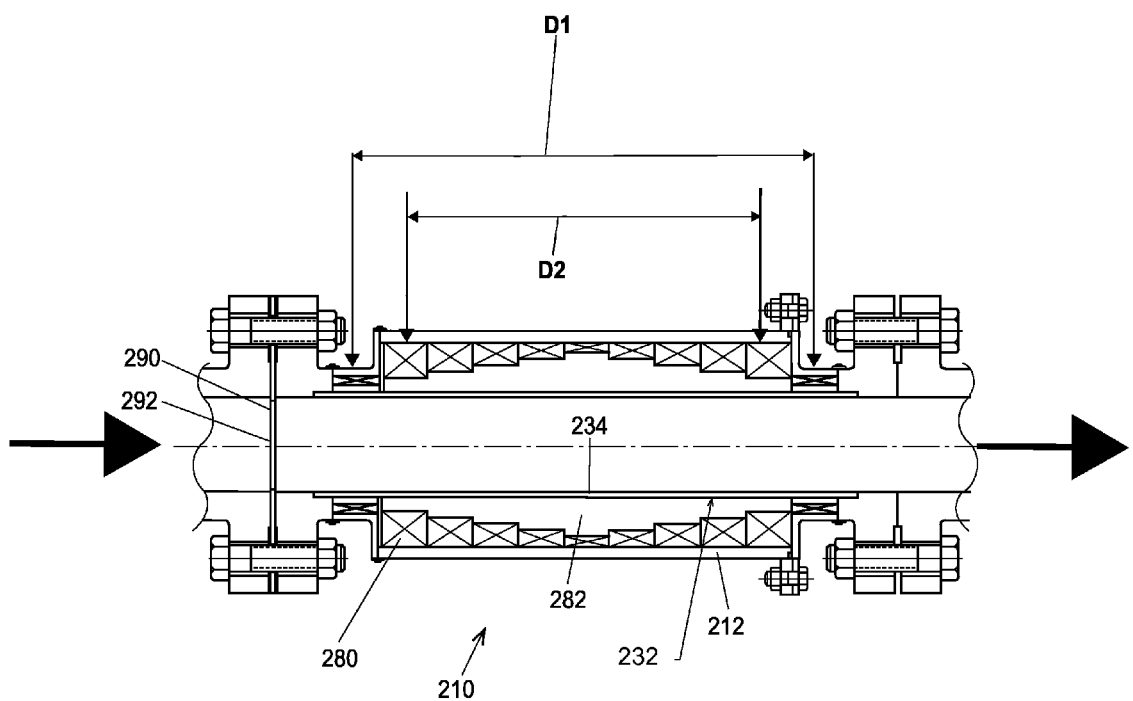
FIG. 5 is a side cross-sectional view of another embodiment of a modal attenuator.

The exemplary embodiment of the modal attenuator 210 illustrated in FIG. 5 is similar to the embodiment of FIG. 4. In FIG. 5, the x-ed sections illustrate solid rings 280. The modal attenuator 210 includes an attenuator body 212 and a screen body 234 disposed within the attenuator body 212 to form an annular space 282. A plurality of rings 280 also defines the annular space 282. However, the modal attenuator 210 includes a pre-attenuation device in the form of a perforated plate 290. The perforated plate 290 may extend across the inside of the attenuator body 212, substantially perpendicular to the direction of fluid flow, which is illustrated by arrows. In one embodiment, the perforated plate 290 may include a plurality of perforations 292, which disrupt sound waves in the fluid flowing through the modal attenuator 210. The perforated plate 290 may target different frequencies of noise than the rest of the modal attenuator 210. In some embodiments, the perforated plate 290 may be partially or fully coated with a sound absorbing material. Additionally, the perforated plate 290 may characterize fluid flow prior to reaching the screen body 234 so that the noise reduction properties of the remainder of the modal attenuator 210 can be optimized.

A first distance 291 may be calculated to correspond to a disruption of a first frequency of noise and a second distance 293 may be calculated to correspond to a disruption of a second frequency of noise. By designing the annular space 282 to different distances that correspond to different frequencies of noise, the modal attenuator may be adapted to target specific frequencies of noise that are present in particular operational environments.

A method of reducing noise in fluid flowing through a pipe may include manufacturing and designing any of the above disclosed embodiments of a modal attenuator and installing the modal attenuator in a process system. More specifically, the method may include arranging a plurality of annular rings within an attenuator body, arranging a perforated screen within the attenuator body so that a distance between the perforated screen and an inner surface of the rings in the plurality of rings defines an annular space, and arranging opposing rings in the plurality of rings at a distance that corresponds to disruption of a particular frequency of sound wave.

In other embodiments, the modal attenuators described herein may be customized for particular uses by making plates made of different materials or by coating/finishing the plates in different ways or with different materials to change the way sound waves are reflected in the device. Mixing plates and/or coatings effectively creates one or more sound lenses that direct sound waves in particular ways to improve sound wave destruction and/or to target particular frequencies.

Although certain modal attenuators have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:

1. A modal attenuator for reducing noise in a process system having fluid flowing through a pipe, the modal attenuator comprising:
   an attenuator body having a lead-in segment and a lead-out segment joined by a connection segment;
   a perforated screen disposed within the attenuator body and spaced apart from the attenuator body to form an annular space; and
   a plurality of rings disposed between the perforated screen and the attenuator body, at least two of the rings in the plurality of rings having different annular thicknesses, thereby creating an annular space between the plurality of rings and the perforated screen, the annular space increasing in size from one end of the attenuator body towards a middle of the attenuator body and then decreasing in size from the middle of the attenuator body towards an outlet;
   wherein sound waves pass through the perforated screen and are reflected back by the plurality of rings to disrupt other sound waves, thereby reducing noise in the modal attenuator.

2. A modal attenuator for reducing noise in a process system having fluid flowing through a pipe, the modal attenuator comprising:
   an attenuator body having a lead-in segment and a lead-out segment joined by a connection segment;
   a perforated screen disposed within the attenuator body and spaced apart from the attenuator body to form an annular space; and
   a plurality of walls disposed on an inner surface of the attenuator body, the walls extending substantially perpendicular to a direction of fluid flow through the attenuator body, and the walls defining a plurality of cavities between the screen body and the attenuator body, the plurality of cavities increasing in volume from an inlet towards the connection segment and decreasing in volume from the connection segment towards an outlet,
   wherein sound waves pass through the perforated screen and are reflected back by the plurality of cavities to disrupt other sound waves thereby reducing noise in the modal attenuator.

3. The modal attenuator of claim 2, wherein the plurality of cavities approximate a curve when viewed in cross-section.

4. The modal attenuator of claim 2, wherein the attenuator body includes a cone-shaped lead-in segment.

5. The modal attenuator of claim 4, wherein the attenuator body includes a cone-shaped lead-out segment.

6. The modal attenuator of claim 1, wherein the attenuator body includes a first flange at a first end and a second flange at a second end.

7. The modal attenuator of claim 1, wherein the perforated screen includes a plurality of perforations.

8. The modal attenuator of claim 7, wherein at least one perforation in the plurality of perforations is circular in shape.

9. The modal attenuator of claim 1, wherein a spring is disposed between one ring in the plurality of rings and an inlet portion of the attenuator body.

10. The modal attenuator of claim 1, wherein the perforated screen has an inner diameter that is substantially the same as an inner diameter of the attenuator body.

11. The modal attenuator of claim 1, further comprising a perforated plate disposed within the attenuator body, the perforated plate extending substantially perpendicular to a direction of fluid flow through the attenuator body.

12. The modal attenuator of claim 1, wherein a distance between opposite rings corresponds to disruption of a particular frequency of sound wave.

13. A method of reducing noise from fluid flowing through a pipe, the method comprising:
   arranging a plurality of annular rings within an attenuator body, at least two annular rings in the plurality of annular rings having different annular thicknesses, thereby creating an annular space between the plurality of annular rings and the perforated screen, the annular space increasing in size from one end of an attenuator body towards a middle of the attenuator body and then decreasing in size from the middle of the attenuator body towards an outlet;
   arranging a perforated screen within the attenuator body, a distance between the perforated screen and an inner surface of the rings in the plurality of rings defining an annular space; and
   arranging opposing rings in the plurality of rings at a distance that corresponds to disruption of a particular frequency of sound wave.

14. The method of claim 13, further comprising arranging a perforated plate within the attenuator body, the perforated plate extending substantially perpendicular to a direction of fluid flow through the attenuator body.

15. The method of claim 14, further comprising coating the perforated plate with a first sound absorbing coating.

16. The method of claim 15, further comprising coating the perforated plate with a second sound absorbing coating.

* * * * *

UNITED STATES PATENT AND TRADEMARK OFFICE
CERTIFICATE OF CORRECTION

PATENT NO. : 8,931,591 B2
APPLICATION NO. : 14/038208
DATED : January 13, 2015
INVENTOR(S) : Allen C. Fagerlund et al.

It is certified that error appears in the above-identified patent and that said Letters Patent is hereby corrected as shown below:

In the Claims:

At Column 6, line 9, "waves" should be -- waves, --.

Signed and Sealed this
Seventeenth Day of May, 2016

Michelle K. Lee
*Director of the United States Patent and Trademark Office*